United States Defensive Publication [19] (H) [11] T968,002

Baxter, Jr. et al. [43] Mar. 7, 1978

[54] POLYURETHANE FOAM STABILIZED AGAINST SCORCH WITH A MIXTURE OF HYDROQUINONE AND A PHOSPHITE CONTAINING SECONDARY ANTIOXIDANT

[76] Inventors: William F. Baxter, Jr., 225 Windmere Pl.; Ted L. Douglas, Rte. 10, Blakely Dr., both of Kingsport, Tenn. 37664; Gether Irick, 424 Meadow La., Kingsport, Tenn. 37663

[21] Appl. No.: 771,706

[22] Filed: Feb. 24, 1977

[51] Int. Cl.[2] ..... C08G 18/06; C08K 5/13; C08K 5/17; C08K 5/52

[52] U.S. Cl. ..... 260/2.5 BB; 260/2.5 AM; 260/2.5 AV; 260/77.5 SS

[57] ABSTRACT

Polyurethane foams are stabilized against scorching when a mixture of hydroquinone and a phosphite containing secondary antioxidant is present in a foam-forming mixture of an organic polyisocyanate with a polyether polyol in the presence of a reaction catalyst and a foaming agent. The proportion of hydroquinone to the phosphite is in the range of 10:1 to about 1:1. Especially advantageous results can be obtained by adding p,p′-dialkylphenylamines containing between 3 and 18 carbon atoms in the alkyl moiety to the above two stabilizers. When the amine is present the stabilizer mixture usually comprises between about 15 and 90% by weight of the amine and the rest of the stabilizer comprises the hydroquinone and the phosphite in the range relative to each other as given above. The proportion of the stabilizer mixture is usually between about 10 and about 50,000 parts per million parts of the polyether polyol. The stabilizer mixture is preferably mixed with the polyol before using the polyol in making urethane foams.

6 Claims, No Sheets Drawing,

11 Pages Specification

The file of this unexamined application may be inspected and copies thereof may be purchased (849 O.G. 1221, Apr. 9, 1968).